United States Patent [19]

Norris

[11] Patent Number: 4,462,045

[45] Date of Patent: Jul. 24, 1984

[54] METHOD OF AND APPARATUS FOR DOCUMENTING AND INSPECTING A CARGO CONTAINER

[75] Inventor: Philip R. Norris, North Reading, Mass.

[73] Assignee: Polaroid Corporation, Cambridge, Mass.

[21] Appl. No.: 334,734

[22] Filed: Dec. 28, 1981

[51] Int. Cl.³ .............................................. H04N 7/18
[52] U.S. Cl. ..................................... 358/93; 358/87; 358/108; 358/244
[58] Field of Search ................. 358/93, 106, 107, 108, 358/87, 244, 244.1, 244.2

[56] References Cited

U.S. PATENT DOCUMENTS

| | | | |
|---|---|---|---|
| 2,680,148 | 6/1954 | Purington et al. | 178/6.7 |
| 2,956,117 | 10/1960 | Ernst et al. | 178/6.8 |
| 3,148,932 | 9/1964 | Simjian | 346/22 |
| 3,339,020 | 8/1967 | Kaufman | 178/7.4 |
| 3,631,773 | 1/1972 | Moodie | 95/1.1 |
| 3,686,434 | 8/1972 | Lemelson | 178/6.6 A |
| 3,696,720 | 10/1972 | Vinson | 95/10 C |
| 3,719,776 | 3/1973 | Fujiyasu et al. | 178/6.7 R |
| 4,027,315 | 5/1977 | Barney | 354/76 |
| 4,063,282 | 12/1977 | Exton | 358/106 |
| 4,148,061 | 4/1979 | Lemelson | 358/101 |
| 4,231,061 | 10/1980 | Freeman | 358/244 |
| 4,240,729 | 12/1980 | Barney | 354/76 |
| 4,283,130 | 8/1981 | Lawson | 354/120 |
| 4,285,587 | 8/1981 | Schiff et al. | 354/124 |
| 4,309,094 | 1/1982 | Bollen | 354/80 |

FOREIGN PATENT DOCUMENTS 55-41446 3/1980 Japan ................................. 358/108

OTHER PUBLICATIONS

Powell–Automated Video Monitoring System–IBM Tech. Disclosure Bulletin, vol. 18, #17, pp. 2280-2281, Dec. 1975.
Dreyfus–Versatile Microsecond Movie Camera–Applied Optics, vol. 19, No. 6, Mar. 15, 1980, pp. 905-908.
Popular Photography, Nov. 1981, pp. 130, 131, 198 & 204.

Primary Examiner—Joseph A. Orsino, Jr.
Attorney, Agent, or Firm—Leslie J. Payne

[57] ABSTRACT

A method of and system for documenting and inspecting an object comprising an imaging apparatus which takes images of different views of an object positioned at an inspection station are disclosed. Included are apparatus for communicating signals representing each of the images from the imaging apparatus to a given location; and apparatus for receiving and recording the communicated images of the different views and additionally alphanumerical information relating to the object on a single, hard copy in a predetermined format thereby providing recorded images of the object from which the condition of the latter may be ascertained and identifying information relating to the object.

11 Claims, 9 Drawing Figures

METHOD OF AND APPARATUS FOR DOCUMENTING AND INSPECTING A CARGO CONTAINER

BACKGROUND OF THE INVENTION

This invention relates generally to a system of recording objects and, more particularly, to a system of visually recording multiple images of cargo containers and information relating thereto in a single, hard copy image.

It is important that cargo containers of the type used in shipping large quantities of goods on ships and trucks be free from damage. Otherwise, of course, the contents carried thereby could be damaged or destroyed. Also, since these containers are in and of themselves expensive, it is highly desirable to repair them as soon as damage is noticed. Towards this end, the containers are generally inspected before leaving the port facility, while loaded on trucks, and again prior to being re-loaded onto another ship.

Presently, inspectors working at these port facilities conduct an inspection visually and then record the appropriate information such as damage in alphanumeric form. Unfortunately due to human factors, this inspection and recordation process is relatively slow and somewhat unreliable. Moreover, the process does not allow for visually recording the physical condition of the containers. Thus, there are no means for easily verifying the accuracy of the alphanumeric information recorded especially in connection with container damage. It is, therefore, desirable to provide an inexpensive and reliable system which allows for accurate verification of the container's physical condition as well as identifying information carried thereby. It is also desirable to have a system with the above characteristics yet decrease the time needed for inspection and recordation while at the same time providing for convenient, long lasting and easily handable documentation.

SUMMARY OF THE INVENTION

It is an object to overcome the previously-mentioned drawbacks regarding known inspection and documentation processes especially for inspecting articles, such as cargo containers. Basically, in accordance with the present invention, there is disclosed a documenting inspection system including imaging means for imaging different views of an object positioned at an inspection station. Included in the system are means for communicating signals representing each image from the imaging means to a given location. Included in the system are means for receiving and recording the communicated images of the different views and additionally alphanumerical information relating to the object on a single, hard copy in a predetermined format thereby providing recorded images of the object from which the condition of the latter may be ascertained and identifying information relating to the object.

In an illustrated embodiment, the receiving and recording means additionally includes means for visually displaying the images of the different views and means for recording these images so that all are presented on the single, hard copy in a manner such that the predetermined format facilitates easy recognition of the object.

In an illustrated embodiment, the system comprises a plurality of electronic imaging apparatus positioned and oriented in cooperative relationship at the inspection station. Each imaging apparatus is operable to take visual images of at least the preselected different views of the object. Operatively connected to each electronic imaging apparatus is a display apparatus. The display apparatus is operable for visually displaying the image signals from the imaging apparatus in picture image form. Included in the system is means operable for recording multiple picture images from the picture images displayed from the display apparatus onto a single, hard copy in the predetermined format.

In an illustrated embodiment, each of the electronic imaging apparatus is defined by a television camera and wherein the display apparatus includes a plurality of television picture monitors, each one of which is operatively connected to a camera. In this embodiment, the recording means includes a photosensitive material of the self-developing type which defines the hard copy.

In still another embodiment the cameras and monitors respectively take and display black-and-white images and the system further includes means for converting the black-and-white images into color images recordable on the single format photosensitive material so as to provide for color photographic images on the format.

The present invention further contemplates use of electronic storing means for storing the image signals and/or alphanumeric information for subsequent recording.

The method of this invention is for documenting and inspecting an object. Such method comprises the steps of taking images of different views of an object positioned at an inspection station; communicating signals representing each of the images to a given location; and receiving and recording the communicated images of the different views and additionally alphanumerical information relating to the object on a single, hard copy in a predetermined format thereby providing recorded images of the object from which the condition of the latter may be ascertained and identifying information relating to the object.

Among the other objects of the invention are, therefore, the provision of documenting and inspecting a system for an object on a single, hard copy; the provision of recording alphanumeric information relating to the object on the single, hard copy; the provision of a system of the above kind utilizing a plurality of electronic imaging apparatus which take images of different views of an object positioned at the inspection station; the provision of a system of the above kind which utilizes a display apparatus for displaying video images of the imaging apparatus; the provision of a system of the above kind in which the images are recorded on the single, hard copy in a predetermined format which facilitates recognition of the object; the provision of a system of the above kind which documents and inspects cargo containers carried by trucks; the provision of a system of the above kind wherein the single, hard copy is defined by a photosensitive material of the self-developable type; the provision of a system of the above kind in which the electronic imaging apparatus is defined by remote black-and-white television cameras and the display apparatus by a black-and-white video picture monitor; the provision of a color conversion means which converts the black-and-white images on the display apparatus to color images which will be recorded on the photosensitive material; and the provision of a method for documenting and inspecting an object on a single, hard copy by recording different views of the object in a predetermined format as well as recording alphanumeric information relating to the truck.

The above and other objects of the present invention will become apparent upon reading the detailed description of the present invention when taken in conjunction with the accompanying drawings wherein like parts are designated by like reference numerals throughout the several views.

DETAILED DESCRIPTION

Reference is made initially to FIGS. 1-3 and 8 for describing, in general terms, the improved documenting and inspecting system 10 of the present invention. The system 10 is arranged for automatically recording on a single, hard copy document 12 (FIG. 8) a mosaic of multiple video picture images of and alphanumeric information relating to the condition of a cargo container 14. Ordinarily, such cargo containers 14 are relatively large. For instance, they may extend from 10 to 40 feet in length and typically have alphanumeric information printed on the exterior thereof. Customarily, after the cargo container 14 has been loaded onto a tractor 16, it is inspected for purposes of creating a trailer receipt and safety inspection report. In the illustrated embodiment, inspection occurs at an inspection bay 18 (FIGS. 2 and 3) defined by and between a plurality of loading islands 20. The invention is usable in situations having inspection areas different from that shown and described.

Figure 2:
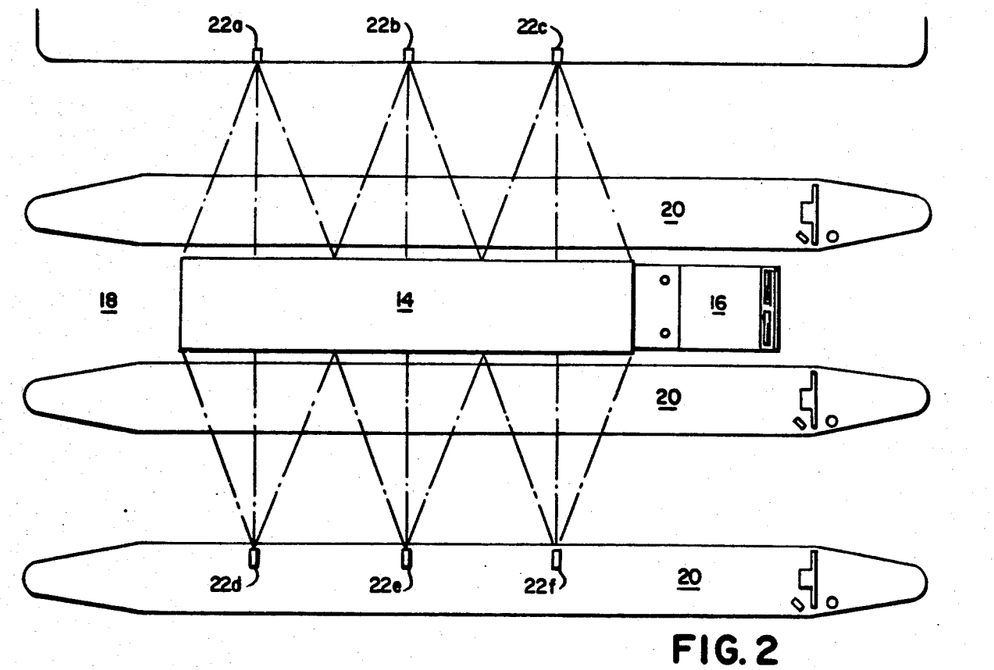
FIG. 2 is a diagrammatic view illustrating the positioning and orienting of several remote TV cameras covering a cargo container mounted on a tractor-trailer.
Figure 3:
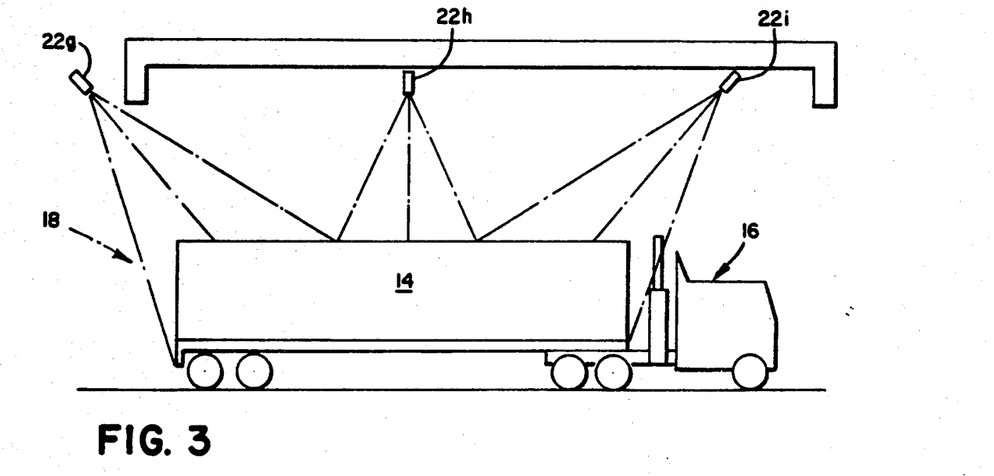
FIG. 3 is a diagrammatic view illustrating the positioning and orienting of several remote television cameras covering several side sections of the cargo containers shown in FIG. 2.

FIGS. 2 and 3 show best a plurality of conventional television (tv) cameras 22a-i which form means for imaging different views of the container. Each one is positioned and oriented in spaced apart relation to the cargo container 14 carried by the tractor 16. Each of the tv cameras 22a-i has the same field of view, which view covers a different surface portion of the cargo container 14. In this regard, six tv cameras 22a-f (FIG. 2) are arranged to view the opposite longitudinal sides of the cargo container 12, while the top, front and back portions of the cargo container 14 are covered by the three overhead tv cameras 22g-i (FIG. 3). The overhead cameras 22g-i are suitably connected to and suspended from a ceiling structure. It will be noted that the overhead camera 22g views the back of the cargo container 14 as well as the back top portion of the container; the camera 22h views the middle top portion of the cargo container; while the camera 22i views the front top portion of the cargo container as well as the front of such container.

Since cargo containers 14 are large, use of a single camera to view the entire side, for instance, would not allow photographing much detail of the container. This is because a single camera would have to be positioned from the side by a distance such that its field angle would encompass the side. In practice this distance would be significant. Not only would the resultant photograph of the container side be inadequate in terms of detail, but the logistics of placing cameras at such remote locations would prove to be particularly difficult. In this embodiment, the container bottom is not inspected. However, this invention envisions that its physical condition can be viewed by another tv camera. The present invention also contemplates that the tv cameras 22a-i can have different fields of view. Towards this end, the cameras can be movable from their depicted positions and/or the cameras can have different lenses. This facilitates viewing cargo containers of different lengths.

In this embodiment each of the tv cameras 22a-i is of the black-and-white type. The significance of using black-and-white will be described presently. Of course, color tv cameras or other black-and-white or color video electronic imaging apparatus are envisioned for use. Each of the remote tv cameras 22a-i is connected through suitable means for communicating signals representing the image, such as cables, to a central monitor/recording apparatus 24.

Figure 4:
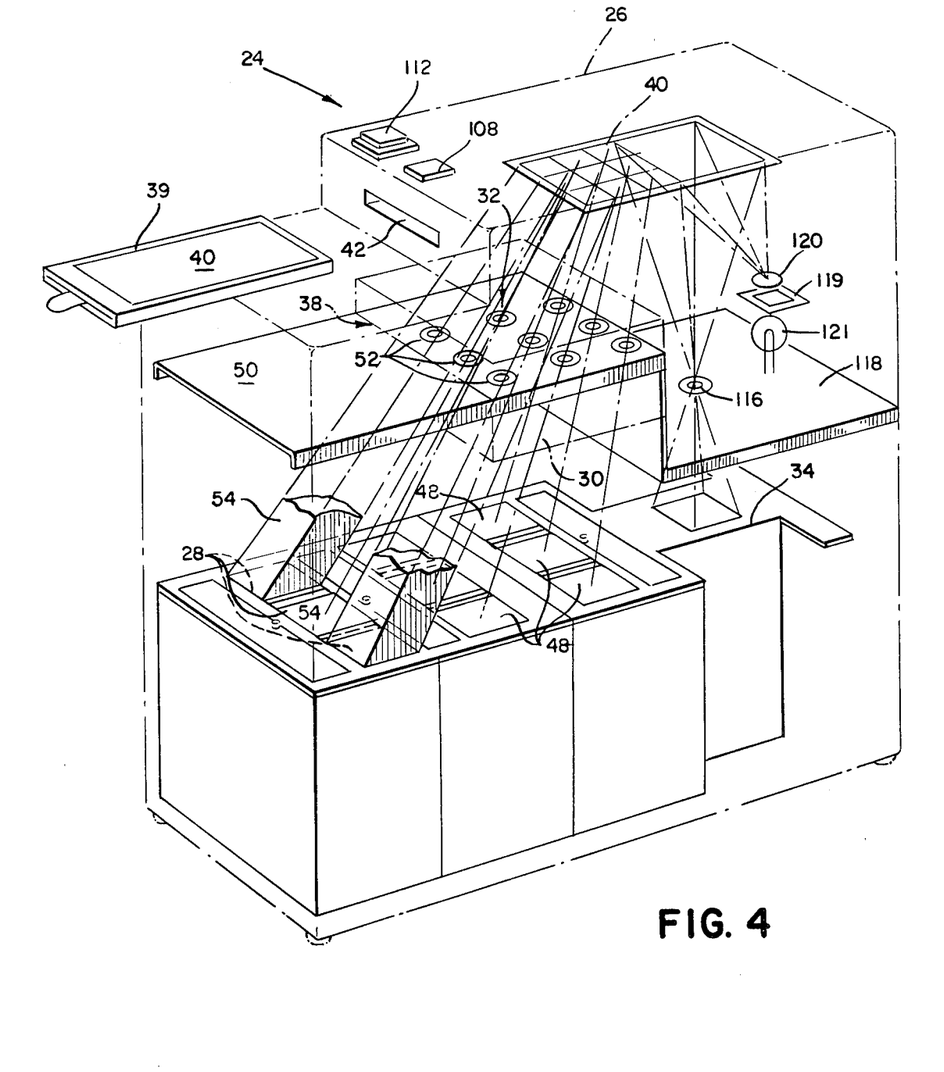
FIG. 4 is a diagrammatic view, in perspective, illustrating a monitor/photographic apparatus device of the present invention.

As seen in FIG. 4, the central monitor/recording apparatus 24 includes a generally hollow, light-tight console 26, housing a plurality of television picture monitors 28, an exposure control assembly generally indicated at 30, a lens assembly 32, a CRT 34 controlled by a microcomputer device 36 (FIGS. 1 and 7), and part of a color converting system 38. The apparatus 24 forms in part the means for receiving and recording the communicated images of the different views and additionally alphanumerical information relating to the container on the document 12.

Also included in the light-tight console 26 is a film receiving area (not shown) which receives a film holder or carrier 39 carrying at least a large single format sheet of photosensitive film 40 that eventually forms the hard copy document 12. The film holder 39 is insertable through opening 42 and cooperates with the film receiving area so that the film 40 is located at a focal plane 44 during the exposure mode. The photosensitive film 40 is, preferably, an 8×10 inch self-developable type manufactured and sold by Polaroid Corporation, Cambridge, Mass., and the film holder 39 can be an 8×10 inch holder also manufactured by Polaroid for such film.

As shown in FIG. 4, the picture monitors 28 are arranged in a 3×3 matrix. The picture monitors 28 display on their respective screens 48 the video pictures transmitted thereto from respective ones of the tv cameras 22a-i. For instance, the two leftmost rows can display the opposing longitudinal sides of the cargo container 14, whereas the rightmost row will display the video pictures of the back, top and front of the container. Hence, the desired exterior surface portions of the cargo container 14 can be simultaneously displayed on the screens 48. This arrangement and matrix of mosaics facilitate multiple and simultaneous recording of images on the film sheet 40 in such a way that the recorded images can be readily recognized as the sides, top, front, and back of the cargo container 14. Such an approach enhances greatly the usefulness of the hard copy document 12. This is because it facilitates immediate recognition of the cargo container and thus aids in the identification and verification of damage.

With continued reference to FIG. 4, the lens assembly 32 includes a lens board 50. The lens board 50 is interiorly mounted on and supported by the walls of the console 26. Formed in the board 50 is a plurality of apertures (not shown) therein, one for each of the picture monitors 28. Included in the lens assembly 32 are lens elements 52, one for each aperture in the lens board 50. Each of the lens elements 52 is arranged to direct the images from a respective one of the tv monitor screens 48 to a correspondingly different portion of the film sheet 40 so that the images from the matrix of monitors are closely adjacent each other on the film sheet. Owing to this, the resulting hard copy document 12 will display the images of the display screens 48 without any spaces between adjacent images of each row. Thus, the resultant document 12 will represent the desired exterior surfaces of the cargo container 14 in a manner which facilitates immediate recognition of the cargo container. To avoid images from each screen 48 being transmitted through other than the desired lens element 52, provision is made for a plurality of light baffles 54; some of which are only partially shown for purposes of clarity. It will be noted that each one of the baffles 54 is constructed and arranged to ensure that images from one display screen 48 do not interfere with the images of other display screens 48.

Figures 5, 5A:
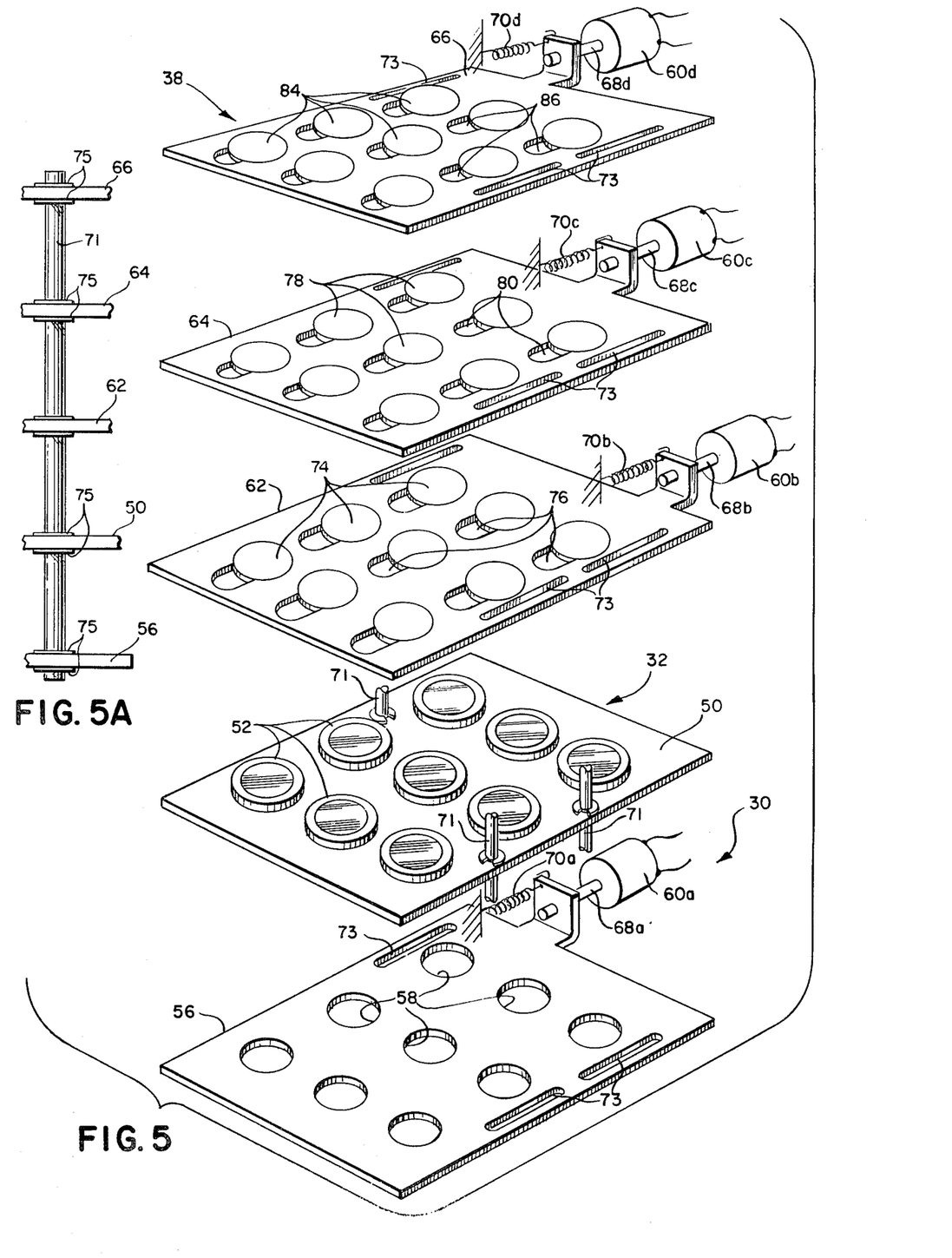
FIG. 5 is an exploded diagrammatic view of a shutter/filter arrangement in the noted monitor/photographic apparatus of the present invention.
FIG. 5A is an enlarged fragmentary view of an arrangement showing elements of an exposure control arrangement supported in stacked relationship.

As shown best in FIG. 5, the exposure control assembly 30 includes a rectangular shutter blade 56 mounted for movement beneath the lens board 50. Formed in the shutter blade 56 is a plurality of spaced apart apertures 58, one for each of the lenses 52 on the lens board 50. The shutter blade 56 is operated by solenoid 60a to move reciprocally between unblocking and blocking positions. In the unblocking position the apertures 58 are in optical registry with the lens elements 52, while in the blocking position they are out of registry. For displacing the shutter blade 56 leftwardly, the solenoid 60a is energized. As a result, a solenoid plunger 68a is extended to urge the shutter blade 56 against the biasing force of the return spring 70a until the apertures 58 are in optical alignment with the lens elements 52. Of course, such registry or alignment allows the lens elements 52 to simultaneously direct the multiple images from the screens 48 onto the film sheet 40. Deenergization of the solenoid 60a allows the shutter blade 56 to return to its unblocking condition under the biasing of the return spring 70a. Of course, movement of the apertures 58 from the blocking to the unblocking position and back again defines an exposure interval.

Referring back to the color conversion assembly 38, it includes a stacked arrangement of spectral filter blades 62, 64, 66. These spectral filter blades 62, 64, 66 are mounted for individual reciprocal movement above the lens board 50. Towards this end, a plurality of upright support posts 71 (FIGS. 5 & 5A) are affixed to the lens board and each extend through an elongated slot 73 formed in the filter blades 62-66, respectively. It will be noted that the posts 71 also extend through slots 73 formed in the shutter blade 56. A plurality of pairs of spacer rings 75 are connected to the posts to maintain each of the blades 56, 62, 64, 66 in their desired planar conditions.

Stationed immediately above the lens elements 52 is the filter blade 62. The filter blade 62 includes a plurality of red spectral filters 74, one for each of the lens elements 52. Also formed adjacent each filter 74 is an opening 76. The red spectral filters 74 and openings 76 are alternately exclusively registerable with the lens elements 52. In this connection, energization of the solenoid 60b causes the solenoid plunger 68b to move the filter blade 62 to the left against the return spring 70b. As a result, the openings 76 move out of optical registry with the lens elements 52, and the red spectral filters 74 move into optical registry with such lens elements. Thus, the red spectral frequencies of the video images from the screens 48 can be transmitted to the film sheet 40. The exposure interval of the red spectral frequencies lasts until deenergization of the solenoid 60b, whereupon the return spring 70b becomes effective to return the filter blade 62 to its original position, wherein the openings 76 are again in optical registry with the lens elements 52. It will be appreciated, of course, that while the red spectral filters 74 are operative, the shutter blade 56 is in its operative or unblocking position. Ihe duration of this red exposure interval is a function of the response time needed for the film sheet 40 to respond to red frequencies.

After the red exposure interval, there will be successive blue and green exposure intervals. Towards this end, the filter blades 64 and 66 are operated in sequence. The filter blade 64 has a plurality of spaced apart blue spectral filters 78 and associated openings 80. Energization of the solenoid 60c extends a plunger 68c to effect movement of the filter blade 64 against the return spring 70c so that the blue spectral filters 78 are moved into operative optical alignment with the lens elements 52. As this occurs, of course, the shutter blade 56 will be again operated to its unblocking position. The blue exposure interval terminates upon deenergization of the solenoid 60c. This allows the return spring 70c to drive the filter blade 64 back to its original position. In such position, the openings 80 are again in optical registry with the lens elements 52. Of course, when the solenoid 60c is deenergized, the shutter solenoid 60a is deenergized to terminate the blue exposure interval.

Energization of the solenoid 60d extends the plunger 68 so as to cause the filter blade 66 to be moved leftwardly against the urging of the return spring 70d so that the plurality of green spectral filters 84 move into operative optical relationship with the lens elements 52. Of course, the shutter assembly is again operative to permit exposure of the photosensitive sheet 40. To terminate the green exposure interval, the solenoid 60d is deenergized. This allows the return spring 70d to drive the filter blade 66 back to its original position, whereby the openings 86 are in optical registry with the lens elements 52.

Figure 6:
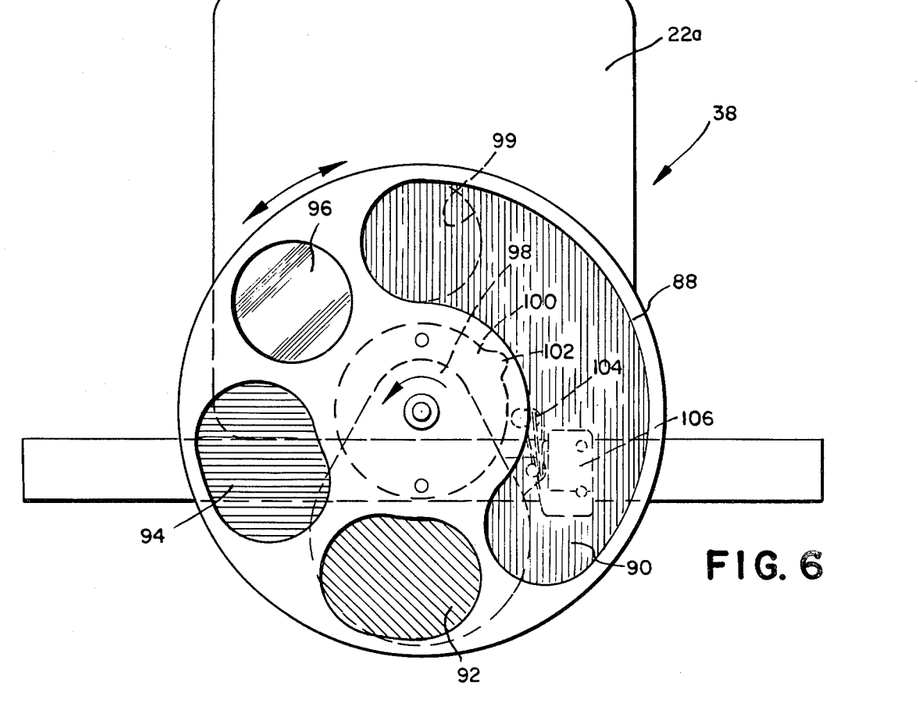
FIG. 6 is a diagrammatic view illustrating a color filter wheel in cooperative relationship with a remote television camera.

Also forming part of the color conversion assembly 38 is a plurality of primary color spectral filter wheels 88. Each of the color wheels 88 is operable in front of a tv camera; one of the wheels is shown in FIG. 6. Basically, each of the color wheels 88 is identical and all are operated in successive synchronism with the successive operation of the spectral filter blades 62-66, in a manner to be explained. Circumferentially spaced on the wheel 88 with respect to each other is a series of spectral filters of the primary colors. In this connection each of the color wheels 88 includes a red spectral filter 90, a blue spectral filter 92, and a green spectral filter 94. Also formed in the color wheel 88 is a translucent element 96. Normally, the translucent element 96 is in operative covering relationship to a tv camera lens 99 when the color wheel 88 is at the start condition. The translucent element 96 allows transmission of white light to the tv cameras 22a–i. In this manner, the monitors 28 will have a light display screen 48 when not displaying the images. The color wheel 88 is rotatably driven by an electric motor 98. During one revolution, the spectral filters 90–94 sequentially pass in front of the tv camera lens 99. As seen in FIG. 6, the red spectral filter 90 is in operative covering relation with respect to the tv camera lens 99. Because of synchronization all red filters 90 will be operative simultaneously over the lens 99, followed by all the blue and green spectral filters 92, 94; respectively. A switch operating cam 100 rotates with the shaft of the motor 98. A cam projection 102 on the cam 100 will trip a lever 104 on microswitch 106 after a revolution of the color wheel 88. This tripping disconnects the motor 98 from a power supply 110 so as to halt rotation of the color wheel 88.

It will be appreciated that during the course of rotation of the color wheels 88 the red filters 90 are operative for a period of time which is generally coextensive with the red exposure interval effected by the shutter and filter blades 56 and 62; respectively. Further in this regard, the time periods the spectral filters 92 and 94 are operative are consistent with the respective time periods the spectral filters 78 and 84 are operative. Since the speed of the motors 98 is the same, the time period is controlled by the circumferential dimension of the spectral filters 90–94.

Because of the above color conversion assembly 38, the black-and-white images from the picture monitors 28 of the successive red, blue and green images of the container 12 can be converted and directed simultaneously to the single film sheet 40 so as to produce multiple color photographs of the physical appearance of the cargo containers 14. Because of the color conversion assembly 38 described above, the resulting color resolution of the photographs will be improved in comparison to conventional color tv monitors. This is because the color conversion system 38 allows all the lines of the black-and-white tv monitors 28 to pass through the red, blue and green spectral filters. This approach is to be contrasted with conventional tv color transmission in which red, green and blue comprise preselected portions of all the total lines of the television screen. Thus, the illustrated conversion system 38 makes provisions for greater color resolution. Moreover, the foregoing arrangement of black-and-white tv cameras and monitors as well as the conversion system 38 is less expensive than a color system.

It will be noted that the television cameras 22a–i and the picture monitors 28 are normally in an operational mode. Towards this end, a separate start switch 108 connects a power supply 110 with the cameras 22a–i and the monitors 28. For starting the recording or exposure cycle, which cycle will be described in greater detail, a start switch 112 is enabled so as to connect the power supply 110 to the master control mechanism 114, as well as enables the microcomputer 36 and the CRT 34. The master control mechanism 114, in turn, cycles operation of the solenoids 60a–d and the electric motors 98.

Figure 1:
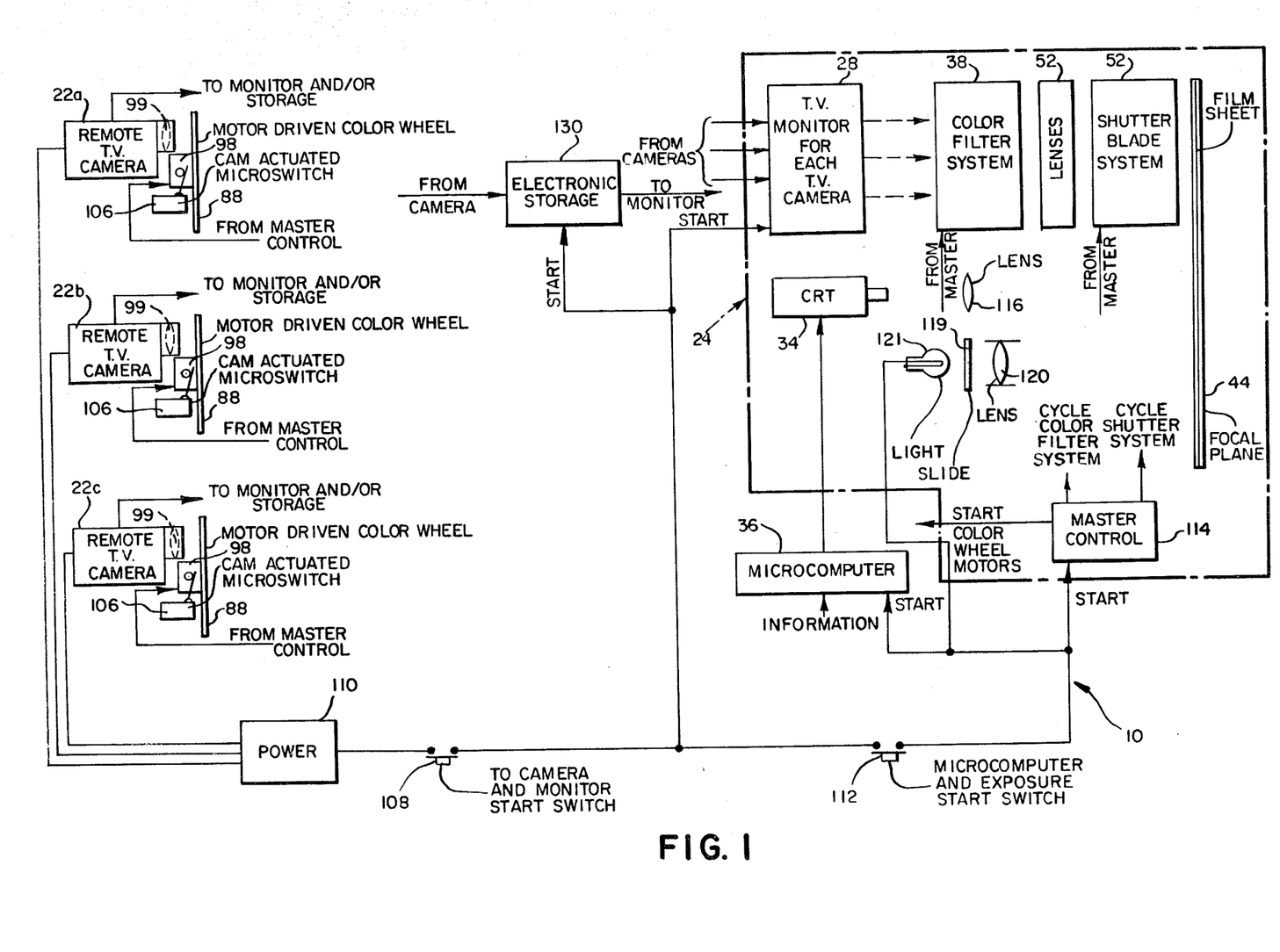
FIG. 1 is a diagrammatic view of the documenting and inspecting system of the present invention.
Figure 7:
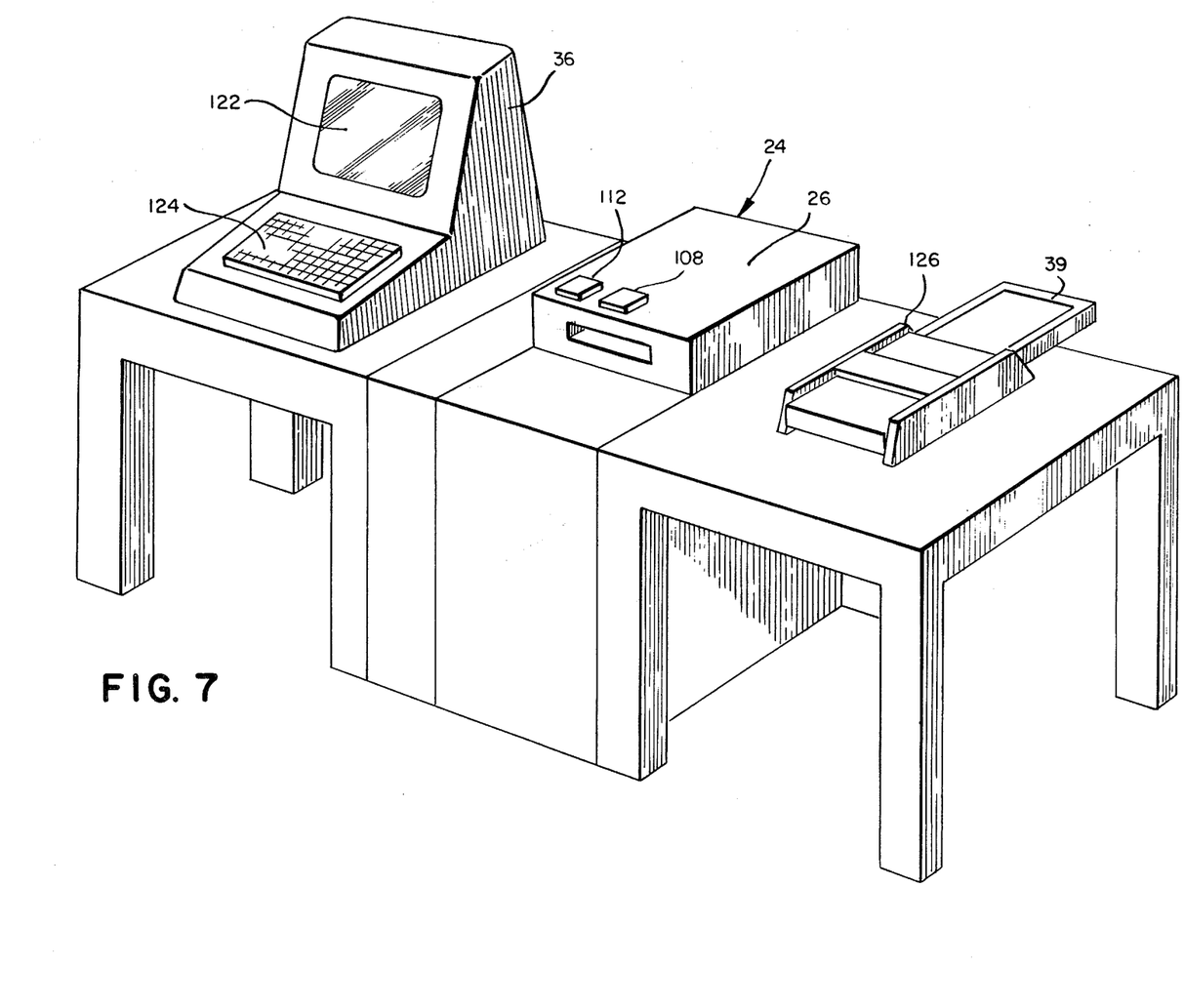
FIG. 7 is a perspective view of a console arrangement usable in the present invention; and, FIG. 8 is a diagrammatic view of a hard copy document made in accordance with this invention.

For recording alphanumeric information on the film sheet 40, there is provided a CRT 34 or other kind of video monitor. The CRT 34 is housed within the console 26 and is operated by the microcomputer 36 (FIGS. 1 and 7). As so operated, the CRT 34 displays on its screen, in video picture form, the alphanumeric information relating to the cargo container 14. The images from the CRT 34 are directed by a lens device 116 mounted on a suitably apertured lens board 118 towards a portion of the film sheet 40 remote from where the pictorial information of the container 14 is to be recorded.

Additionally provided in this system 10 is a means, diagrammatically shown, for projecting onto the film sheet 40 a blank report format for use in conjunction with the alphanumeric information generated by the CRT 34. The combination of the alphanumeric information generated by the CRT 34 and the format can provide a document usable as a trailer receipt and safety inspection document. Included in this means is a 35 mm slide transparency 119 having images of the blank report format thereon. These images are directed by a lens 120 onto the film sheet 40. Behind the slide 119 is a suitably activated light source 121 which can be operated during the exposure cycle of the film sheet 40. This blank report format slide 119 produces an image of a blank trailer interchange receipt and safety inspection report. Other kinds of formats are, of course, usable. Such a format is currently used by some when inspecting cargo containers. Thus, people in this area would immediately recognize the receipt and report format. Moreover, it is accompanied by the images of the cargo container 14. Thus, a single, hard copy contains all of this information.

The microcomputer 36 is of known type and has its own display screen 122 (FIG. 7). It can be preprogrammed so that an operator is able to feed information thereinto by means of keyboard 124. Such information is then displayed on the CRT 34 in a preselected fashion. Also, the microcomputer 36 is preprogrammed so that the container information displayed on the CRT 34 will be at preselected locations on the screen so that when the images are displayed they can be directed to the film sheet 40 at a desired location in relation to the images of the blank receipt and report form provided by the slide 119.

Other systems for recording alphanumeric information are, of course, contemplated. For instance, the alphanumeric information may be directed onto the film sheet 40 by reason of an indicia card being inserted within an opening (not shown) in the console 26 and reflective mirrors (not shown) in the console directing such information on the film sheet 40 through a suitable lens.

After exposure of the film sheet 40 in the carrier 39, both are withdrawn from the opening 42. Thereafter, the carrier 39 and the film sheet 40 are inserted into the processing unit 126. The processing unit 126 can be an 8×10 inch processor of the type manufactured and sold by Polaroid Corporation, Cambridge, Mass. In the processing unit 126, the exposed film sheet 40, of the self-developing type, is processed so that the resulting hard copy document 12 is formed instantly. Although the present embodiment has disclosed a film sheet 40 being manually inserted into the console 26, it will be appreciated, of course, that photosensitive material may be fed automatically and suitably processed.

It is believed the operation of the present invention is evident from the foregoing description. A brief description of the operation of the verification system 10 is, however, hereinafter set forth. Once the cargo container 14 is correctly positioned at the inspection bay 18, an operator may commence operation of the recording cycle. The start switch 112 is operated to actuate the master control mechanism 114 and enable the microcomputer 36 and the CRT 34. Also, the control mechanism 114 begins the rotation cycle of the color wheels 88 and begins the noted series of exposure intervals by the spectral filters 74, 78, 84 in synchronization with the operation of the spectral filters 90, 92, 94 of the color wheels 88. As noted, each of the tv cameras 22a-i serves to transmit to the picture monitors 28 video picture signals of that portion of the cargo container 14 in its field of view. While the tv cameras 22a-i are operative, the motors 98 will be simultaneously operated to turn the color wheels 88. In this manner, all the tv camera lenses 99 have positioned in overlying operative relationship thereto a red spectral filter 90. Simultaneously, the master control mechanism 114 energizes the solenoid 60a so that plunger 68a forces the shutter blade 56 towards its unblocking condition. Conjointly, the solenoid 60b is energized so that its plunger 68b moves the filter blade 62 towards its operative position. As a result, the red spectral filters 74 are in overlying relationship with corresponding ones of the lens elements 52. Thus, the red spectral frequencies are passed to the tv cameras, and the spectral filters 74 transmit the black-and-white image of the red spectral images from the picture monitors 28 to the film sheet 40. This red exposure period is controlled by the length of time the red spectral filters 90 are operative. Termination of this red exposure period occurs when both the solenoids 60a and 60b are deenergized. As a result, the return spring 70a acts to return the shutter blade 56 to its unblocking position, thereby terminating exposure. Simultaneously, the return spring 70b effects return of the filter blade 62 to its inoperative position. In this position, the openings 76 are in optical registry with the lens elements 52.

Continued rotation of the color wheels 88 bring the blue spectral filters 92 into overlying relationship with respect to the lenses 99. For the period the blue spectral filters 92 are operative, both the solenoids 60a and 60c are simultaneously energized by the control mechanism 114. In this regard, the energized solenoid 60a moves the shutter blade 56 towards its operative or exposure position. In such position the openings 58 are in registry with the lens elements 52. Simultaneously, the filter blade 64 is moved to its operative position by solenoid 60c, whereby the blue spectral filters 78 are in operative relationship with respect to the lens elements 52. Thus, the blue spectral frequencies of the black-and-white images of the blue frequencies of the container 14 will be directed to the film sheet 40. The duration of the blue spectral frequency exposure will be timed to be generally commensurate with the time the blue spectral filters 92 are in overlying relationship with the lenses 99. Termination of this exposure occurs when the solenoids 60a, 60c are deenergized by the control mechanism 114. Thereafter, the return springs 70a, 70c are effective to move their respective blades to their inoperative positions.

Continued rotation of the color wheels 88 brings the green spectral filters 94 before the lenses 99. The green spectral filters 94 will be effective over the lenses 99 for generally the same time period that the green spectral filters 84 are operative over the lens elements 52. Towards this end, the solenoids 60a and 60d are simultaneously energized by the control mechanism 114. Such energization moves the shutter blade 56 to its open position so that the openings 58 permit the images from the display screens 48 through the lens elements 52. With the solenoid 60d energized, the spectral filter blade 66 is moved toward its operative position, whereby the green spectral filters 94 are in overlying relationship to the images being directed from the lens elements 52. Termination of this exposure period occurs when both the solenoids 60a and 60d are deenergized by the control mechanism 114. Deenergization allows the return springs 70a, 70d to return their respective blades toward their original positions.

Continued rotation of the motors 98 will cause the cam projection 102 to close the microswitches 106. This, in turn, stops the motors 98, thereby stopping the color wheels 88. These wheels 88 will come to rest with the translucent elements 96 over the lenses 99. The control mechanism 114 ceases to energize the solenoids until the next exposure cycle is commenced by closing the start switch 112.

The alphanumeric information regarding the cargo container 14 is displayed on the CRT 34. This information is entered on the keyboard 124. The microcomputer 36 is preprogrammed to display the desired alphanumeric information on that portion of the CRT 34 which would permit the lens 116 to direct these images onto the appropriate location on the film sheet 40 adjacent desired areas of the blank report provided by the slide transparency 119. For instance, the background slide 119 may carry indicia indicating weight of the cargo container 14. Then an operator would operate the keyboard 124 so that the actual weight of the cargo container 14 would be displayed in alphanumeric form on the CRT 34 in an appropriate location thereon so that the images from the CRT can be directed onto the film sheet 40 adjacent the appropriate indicia projected from the slide 119. The microcomputer controls the exposure of the film sheet for the alphanumeric information.

Thereafter, the film carrier 39 is removed from the console 26 and inserted into the film processing unit 126. This enables a user to instantly process the self-developable film 40 such that the resulting hard copy 12 may be instantly produced.

Figure 8:
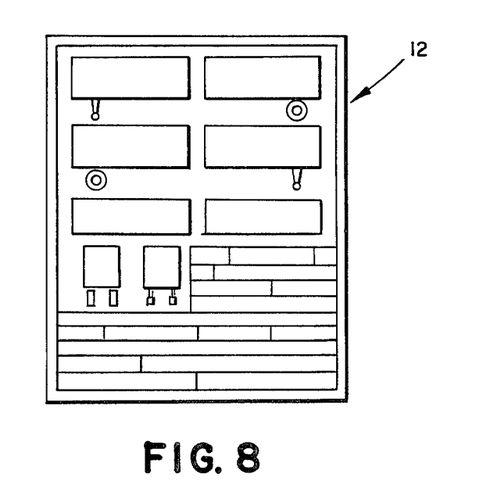

The resulting hard copy document 12 has a mosaic of multiple cargo container images in preselected locations so that the images display the actual physical appearance of the container in a sequence which aids in its immediate recognition as a container and which facilitates subsequent inspection and verification. Additionally, the alphanumeric information regarding the container is provided. The result is a hard copy document 12 which allows independent verification of the cargo container's condition and provides a trailer interchange receipt document that is usable instead of the conventional trailer interchange receipt and safety inspection record. It will be appreciated that a plurality of single documents can be produced. For this to occur a new photosensitive sheet would be used for each hard copy.

This invention envisions that an electronic storage device 130 can be operated to store the images from the tv cameras as well as the alphanumeric information generated on the CRT. This stored information can be subsequently transmitted to the central monitor/recorder 24 or another such recorder at a remote central station so that the information can be reduced to hard copy form.

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. A documenting inspection system for a cargo container comprising:
   imaging means for imaging different views of a cargo container positioned at an inspection station;
   means for communicating signals representing each said image from said imaging means to a given location including a plurality of televeision cameras each of which is positioned to image a different view of the cargo container; and
   means for receiving and recording said communicated images of different views and additionally alphanumerical information relating to said object on a single, hard copy in a predetermined format, said receiving and recording means additionally includes a plurality of video monitors each one of which is connected to a respective one of said cameras for displaying the images of the associated camera, whereby all said images of said different views are generally simultaneously displayed, said hard copy is defined by a photosensitive material of the self-developable type, wherein the predetermined format includes having the images of the different views of the container arranged in a composite manner, whereby the recorded images present the container in a manner that is recognizable by a viewer of the container as a true picture of the container being imaged thereby providing recorded images of the object from which the condition of the latter may be ascertained and identifying information relating to the object.

2. A documenting inspection system for cargo containers of the kind carried by trucks comprising:
   means for defining an inspection station whereat the cargo container is positioned so as to enable imaging of the different views thereof;
   imaging means for imaging different views of a cargo container positioned at the inspection station;
   means for communicating signals representing each said image from said imaging means to a given location; and
   means for receiving and recording said communicated images of substantially all said different views of the cargo containers and additionally alphanumerical information relating to the container on a single, hard copy in a predetermined format wherein the predetermined format includes having the images of the different views of the container arranged in a composite manner so that they are closely adjacent each other, whereby the recorded images present the container in a manner that is recognizable by a viewer of the container as a true picture of the container being imaged thereby providing recorded images of the container from which the condition of the latter may be ascertained and identifying information relating to the object, said imaging means includes a plurality of television cameras each of which is positionable so as to image the different views of the cargo container, said recording means includes a plurality of video monitors each of which is connected to a respective one of said cameras for displaying the images of the associated camera, whereby each of the monitors can display relatively detailed images of the different areas of the cargo container in closely spaced relationship so that the images can be subsequently displayed for recordation on the single, hard copy so that the images represent a true picture of the container and so that the alphanumeric images can be recorded adjacent the images of the container.

3. The system of claim 2 in which the single, hard copy is defined by a photosensitive material of the self-developable type.

4. The system of claim 2 in which the television cameras and video picture monitors are of the kind producing black-and-white images, and further including means for sequentially using primary color spectral filters to sequentially filter the images to the television cameras and for synchronously sequentially using primary color spectral filters to spectral filter the black-and-white images of the monitor to the single, hard copy.

5. The system of claim 2 wherein a first plurality of television cameras image opposite sides of the cargo container, and a second plurality of television cameras image respectively the front and part of the top of the containers; another portion of the container top; and the back and the remaining top portion of the cargo container.

6. The system of claim 5 wherein the first and second plurality of television cameras have generally equal viewing zones.

7. A method of documenting and inspecting a cargo container comprising:
   taking images of different views of the container positioned at an inspection station by a plurality of television cameras each of which is positioned so as to image a different view wherein a first plurality of television cameras image opposite sides of the cargo container, and a second plurality of television cameras image respectively the front and part of the top of the containers; another portion of the container top; and the back and the remaining top portion of the cargo container;
   communicating signals representing each of the images to a given location; and
   receiving substantially all the communicated signals representative of the images of the cargo container and generally simultaneously displaying substantially all the images of the different container views on a plurality of video monitor so that respective images are on respective monitors and are in a composite fashion so that they are closely adjacent each other, whereby the displayed images present the container in a manner that is recognizable by a viewer as being the container imaged and displaying additional alphanumeric information relating to the container; and
   recording the displayed images of the different views and the related alphanumeric information on a single hard photosensitive material of the self-developing type whereby the images recorded present a true picture of the container from which the condition of the latter may be ascertained, and recording the alphanumeric information on the single hard photosensitive material adjacent the container so that information relating to the container is recorded.

8. The method of claim 7 wherein the displayed images are black-and-white images and the step of taking the images of the object includes taking images wherein successive ones of primary color spectral filters intercept the view in substantial synchronization with matching ones of primary color spectral filters passing between the displayed black-and-white images and the photosensitive material.

9. The method of claim 7 wherein the recording step includes recording the images and alphanumerical information on a single sheet of photosensitive material of the self-developable type.

10. The method of claim 9 wherein the step of displaying the images includes displaying black-and-white images of the object further including the step of converting the black-and-white images displayed into color images recordable on the photosensitive sheet by passing successive ones of primary color spectral filters in the path between the displayed black-and-white images and the photosensitive material.

11. A method of documenting and inspecting a cargo container comprising:

taking images of different views of the cargo container positioned at an inspection station by a plurality of television cameras each of which is positionable so as to image a different view, wherein a first plurality of television cameras image one side of the cargo container, a second plurality image another side of the cargo container, and a third plurality image the top and back of the cargo container;

communicating signals representing each of the images of the container to a given location; and receiving substantially all the communicated signals representative of the images of the cargo container and generally simultaneously displaying substantially all the images of the different container views on a plurality of video monitors so that respective images are on respective monitors and are in a composite fashion so that they are closely adjacent each other, whereby the displayed images present the container in a manner that is recognizable by a viewer as being the container imaged and displaying additional alphanumeric information relating to the container; and recording the displayed images of the different views and the related alphanumeric information on a single hard photosensitive material of the self-developing type whereby the images recorded present a true picture of the container from which the condition of the latter may be ascertained, and recording the alphanumeric information on the single, hard photosensitive material adjacent the container so that information relating to the container is recorded.

* * * * *